(12) United States Patent
Jin et al.

(10) Patent No.: US 11,475,095 B2
(45) Date of Patent: Oct. 18, 2022

(54) STATISTICS ACCELERATION IN MULTIVARIATE TESTING

(71) Applicant: Optimizely, Inc., San Francisco, CA (US)

(72) Inventors: Jimmy Jin, San Francisco, CA (US); Leonid Boris Pekelis, Los Angeles, CA (US)

(73) Assignee: OPTIMIZELY, INC., San Francisco, CA (US)

( * ) Notice: Subject to any disclaimer, the term of this patent is extended or adjusted under 35 U.S.C. 154(b) by 171 days.

(21) Appl. No.: 16/392,344

(22) Filed: Apr. 23, 2019

(65) Prior Publication Data
US 2020/0342043 A1 Oct. 29, 2020

(51) Int. Cl.
| | |
|---|---|
| *G06F 16/957* | (2019.01) |
| *G06Q 30/02* | (2012.01) |
| *G06F 16/9537* | (2019.01) |
| *H04L 67/50* | (2022.01) |

(52) U.S. Cl.
CPC ...... *G06F 16/9577* (2019.01); *G06F 16/9537* (2019.01); *G06Q 30/0277* (2013.01); *H04L 67/535* (2022.05)

(58) Field of Classification Search
CPC .................. G06F 16/9577; G06F 16/9537
See application file for complete search history.

(56) References Cited

U.S. PATENT DOCUMENTS

| | | | | |
|---|---|---|---|---|
| 8,296,643 | B1* | 10/2012 | Vasilik | G06F 16/958 715/200 |
| 10,534,851 | B1* | 1/2020 | Chan | G06Q 30/0255 |
| 2010/0161785 | A1* | 6/2010 | Xue | G06F 16/9535 709/224 |
| 2012/0290399 | A1* | 11/2012 | England | G06Q 50/01 705/14.66 |
| 2012/0331128 | A1* | 12/2012 | Seifert | G06F 16/958 709/224 |
| 2013/0191208 | A1* | 7/2013 | Chourey | G06Q 30/0201 705/14.45 |
| 2014/0143655 | A1* | 5/2014 | Alon | G06F 40/14 715/234 |
| 2014/0350870 | A1* | 11/2014 | Sagberg | G01N 21/3504 702/50 |
| 2015/0213026 | A1* | 7/2015 | Seifert | G06F 16/24578 707/758 |
| 2015/0227962 | A1* | 8/2015 | Wical | G06Q 30/0243 705/14.42 |

(Continued)

*Primary Examiner* — Ariel Mercado
(74) *Attorney, Agent, or Firm* — Womble Bond Dickinson (US) LLP

(57) ABSTRACT

A method includes determining a plurality of epochs from a timeline of an experiment, wherein each of the plurality of epochs corresponds to a constant traffic allocation. The method further includes calculating, by a processing device, first and second mean values corresponding to a baseline of the experiment and a variation of the experiment for each epoch, respectively. The method further includes determining, for each epoch, a difference between the first mean value and the second mean value to generate a plurality of differences. The method further includes calculating, by the processing device, a weighted sum of the plurality of differences to generate a final difference in mean values.

20 Claims, 10 Drawing Sheets

(56) References Cited

U.S. PATENT DOCUMENTS

| | | | | |
|---|---|---|---|---|
| 2015/0341684 A1* | 11/2015 | Kitts | ................ | H04N 21/26283 725/14 |
| 2018/0349258 A1* | 12/2018 | Kharitonov | ......... | G06F 11/3684 |
| 2019/0236306 A1* | 8/2019 | Ding | ................... | G06F 11/3006 |

* cited by examiner

STATISTICS ACCELERATION IN MULTIVARIATE TESTING

FIELD OF TECHNOLOGY

The embodiments described herein pertain in general to statistics acceleration and more particularly, to statistics acceleration in multivariate testing.

BACKGROUND

Content variation testing is a type of experiment that tests changes to content against a current version of the content. One example of content variation testing is web page variation testing where an experiment is conducted that tests a web page (or one or more elements on the page) against another design of the web page (or one or more variations of the elements on the page). During variation testing of a web page, user interaction with a web page or its variations are measured (for example, whether a user clicks through a button or a variation of a button), and the changes to a web page (or its elements) that produce positive or negative results are determined. The positive results associated with a particular change to a web page validates that the change to the web page should be used in a production version of the web page.

Figure 1:
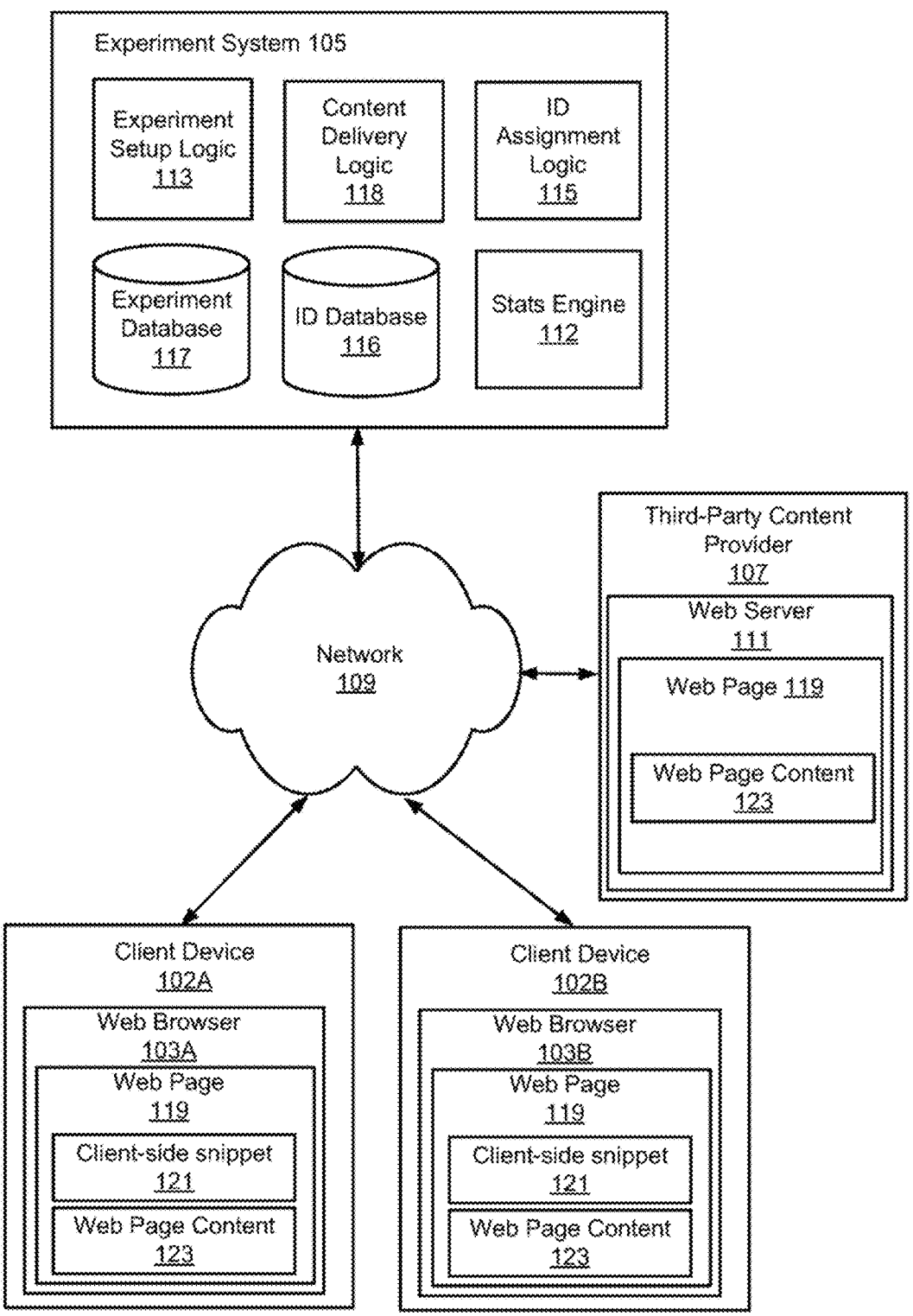
FIG. 1 is a block diagram of a variant testing system environment, according to one embodiment.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Content providers may run content experiments such as A/B tests to answer specific questions regarding which variation of a content item such as a web page or digital product (including various features) are more successful. Many content experiments include visitor criteria that determines whether a visitor is eligible for the experiment and if so, which variations of the content experiment should be shown to the visitor. The systems that implement these content experiments may be implemented in the backend of the content provider's system or as a separate node that communicates with the back end of the content provider's system. Simultaneously, content providers may bring up content delivery networks (CDNs) in the font-end of their systems to provide for content caching, including caching of content experiment variations.

In some embodiments, the difficulty of running experiments increases with the number of experiments run. Several problems may arise in this context. For example, data collection is costly, and time spent experimenting means there is less time to exploit the value of the eventual winner of the experiments. In another example, creating more than one or two variations can significantly delay the time required to reach statistical significance.

Advantageously, the methods and systems described herein allow for the acceleration of impact and learnings of experiments. To accelerate impact, a regret minimization strategy may be employed. In one embodiment, the regret minimization strategy may be employed when it is desirous to weight visitor experiences toward the leading variation during the experiment lifecycle. To accelerate learnings, a time minimization strategy may be employed. The time minimization strategy may be employed when it is desirous to create more variations (e.g., at least three) but still reach statistical significance quickly.

These strategies are designed to optimize rewards for a period of time and/or identify a statistically significant variant as quickly as possible by intelligently changing the allocation of traffic between variations (e.g., arms) of the experiment. Problematically, in one embodiment, when underlying conversion rates or means (e.g., mean values) are varying over time (e.g., due to seasonality), dynamic traffic allocation can cause substantial bias in estimates of the difference between the treatment and the control, a phenomenon known as Simpson's Paradox. This bias can cause problems in the observation of statistical results on experiments, breaking usual guarantees on false discovery rate control.

Advantageously, to prevent this, an Epoch Stats Engine is described herein. In one embodiment, Epoch Stats Engine may be a stratified estimate of the difference in mean values between the control and the treatment. Because it requires no estimation of the underlying time variation and is also compatible with other central limit theorem-based approaches such as the t-test, the Epoch Stats Engine described herein allows for a more accurate combination of traditional hypothesis testing and bandit approaches to A/B testing in practice than previously possible.

FIG. 1 is a block diagram of a variant testing system environment 100 according to one embodiment. Environment 100 includes client devices 102 (e.g., client device 102A and client device 102B). In one embodiment, client device 102A is a device of a first user and client device 102B is a device of a second user. Client device 102A may represent one or more devices of the first user and client device 102B may represent one or more devices of the second user. Client devices 102 are connected to an experiment system 105 and a third-party content provider 107 via a network 109. Although the environment 100 shown in FIG. 1 only includes two client devices 102, the environment 100 can include any number of client devices (e.g., thousands of client devices 102).

FIG. 1 and the other figures may use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

Network 109 enables communication among the entities connected to it. In one embodiment, network 109 is the Internet and uses standard communications technologies and/or protocols. Thus, network 109 can include links using technologies such as Ethernet, WiFi (e.g., 802.11), worldwide interoperability for microwave access (WiMAX), 3G, Long Term Evolution (LTE), digital subscriber line (DSL), asynchronous transfer mode (ATM), InfiniBand, etc. Similarly, the networking protocols used on network 109 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 109 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In one embodiment, network 109 may include but is not limited to any combination of a local area network (LAN), a metropolitan area network (MAN), and a wide area network (WAN). In another embodiment, the entities use custom and/or dedicated data communications technologies instead of, or in addition to, the ones described above.

Client devices 102 may communicate with the third-party content provider 107 via the network 109 to receive content items such as web pages from the third-party content provider 107. In one embodiment, each client device 102 is a computer system capable of communicating with the experiment system 105 and the third-party content provider 107. Examples of client devices 102 include a personal computer, a mobile phone, a tablet, a personal digital assistant (PDA), or a laptop. As shown in FIG. 1, each client device 102 includes a web browser 103 (e.g., web browser 103A and web browser 103B). Web browser 103 is a computer program stored on a client device 102 that allows the user of client 102 to access web pages on the World Wide Web such as web pages provided by the third-party content provider 107.

As mentioned above, the environment 100 includes a third-party content provider 107. Hereinafter, the third-party content provider 107 is referred to as a "content provider 107" for ease of description. The content provider 107 may be an individual, a group of individuals, or an entity such as a company. In one embodiment, the content provider 107 provides content items to client devices 102. While only one content provider 107 is shown, it is understood that any number of content providers are supported and can be in the environment 100 at any time.

In one embodiment, the content items provided by the content provider 107 include web pages. However, the content provider 107 may provide other types of content items (e.g., digital content) such as software applications, including web applications, mobile device applications, etc.). The web pages and software applications may include video, audio, a combination of video and audio, still images (e.g., JPEG), text documents, advertisements, and/or any other types of content. For purposes of convenience and the description of one embodiment, the content items provided by the content provider 107 will be referred to as a web pages, but no limitation on the type of content items are intended by this terminology.

In one embodiment, the content provider 107 operates in conjunction with the experiment system 105 to perform variation testing on web pages. The content provider 107 may display different variations of a web page, including different features, to client devices 102 based on instructions from the experiment system 105 that is conducting a variation test on the web page for the content provider 107. A variation test for a web page may test changes to the web page against the current variation of the web page to determine how the variation alters user interaction, or some other metric, with the web page or whether the changes produce a desired result. An example of a desired result resulting from a change to a web page is an increased selection of an advertisement(s) included in the web page or increased purchases of a product advertised on a web page. Thus, variation testing validates a new design of a web page or changes on elements on the web page before the new design or changes are put into production by the content provider 107.

For a given web page, the content provider 107 may have one or more variations of the web page that are used in a variation test for the web page. In one embodiment, a variation test of a web page involves an experiment that tests an "A" variation known as the control and a "B" variation known as the variant on users requesting the web page from the content provider 107. For ease of discussion, the embodiments discussed herein describe a web page having only two variations: the control and the variant. However, in other embodiments, a web page can have any number of variants.

In one embodiment, experiment system 105 includes a stats engine 112. Stats engine 112 may provide for the implementation and execution of one or more of the operations described herein. In one embodiment, stats engine 112 provides for an accelerate impact algorithm to automatically optimize a primary metric by dynamically reallocating traffic to whichever variation is performing the best. Advantageously, this may help extract as much value as possible from the leading variation during the experiment lifecycle, and avoids the opportunity cost of showing sub-optimal experiences.

The accelerate impact algorithm may be advantageous in a variety of contexts. For example, consider the case of promotions and offers. Here, users who sell consumer goods on their site often focus on driving higher conversion rates. One effective way to do this is to offer special promotions that run for a limited time. Using the accelerate impact algorithm (e.g., instead of running a standard A/B/n test) may send more traffic to the over-performing variations and less traffic to the underperforming variations. In another example, users may have long-running campaigns to which they continually add variations for each experience. For example, an airline may deliver destination-specific experiences on the homepage based on past searches. Over time, they might add different images and messaging.

For long-running campaigns, the goal is often to drive as many conversions as possible, making it a good fit for implementation of accelerate impact algorithm. In one embodiment, to use the accelerate impact algorithm, a primary metric and at least two variations, including the original or holdback (baseline) variation, may be utilized. In other embodiments, the accelerate impact algorithm may be utilized in any other suitable context.

In one embodiment, the accelerate impact algorithm works to maximize the payoff of an experiment by showing more visitors the leading variations. For example, when trying to increase revenue, accelerate impact may determine which variation does that the best, and then send more traffic to it. In some embodiments, the usual measurements and statistics generated by an A/B test may not be shown because the strategy may be to maximize payoff during the experiment, not to predict future behavior.

In another embodiment, stats engine 112 provides for an accelerate learnings algorithm to get an actionable result as quickly as possible. In one embodiment, the accelerate learnings algorithm may be utilized for experiments with a single primary metric tracking unique conversions and at least three variations. In other embodiments, the accelerate learnings algorithm may be utilized in any other suitable context.

In one embodiment, the accelerate learnings algorithm shortens experiment duration by showing more visitors the variations that have a better chance of reaching statistical significance. Accelerate learnings attempts to discover as many significant variations as possible. The advantage of this algorithm is that it may help maximize the number of insights from experiments in a given time frame, so that less time is spent waiting for results. In one embodiment, to use the accelerate learnings algorithm, a unique conversion primary metric and at least three variations, including the original or holdback (baseline) variation, may be used. In other embodiments, the accelerate learnings algorithm may be utilized in any other suitable context.

In one embodiment, the auto-allocation operations described herein automatically adjust traffic allocation to weight the higher-performing variation(s) more heavily, using a multi-armed bandit algorithm (e.g., a form of machine learning), to minimize the sample size required to reach statistical significance. There are a variety ways to optimize for the same metric. One approach is called "regret minimization", which, as the name suggests, seeks to minimize the "regret" of delivering a sub-optimal experience. Over-performing variations are exploited, reducing the cost of data collection and getting more value out of time-constrained content. In one embodiment, the traffic allocation may be computed using a combination of a Thompson sampling (for binary metrics) and an Epsilon-greedy approach (for numerically valued metrics). A second approach is called "time-minimization" (alternatively, "sample-minimization" or "n-minimization"), which attempts to distribute traffic in a way that will help the statistical significance calculation reach a certain threshold as quickly as possible. The goal in this case is to reach a conclusion as quickly as possible. In one embodiment, the traffic allocation may be computed using a custom best-arm identification multi-armed bandit algorithm based on the lil'UCB algorithm.

In one embodiment, the Stats Accelerator algorithms rely on dynamic traffic allocation to achieve its results. Anytime traffic is allocated dynamically over time, the risk of introducing bias into results is possible. Left uncorrected, this bias can have a significant impact on reported results. This is known as Simpson's Paradox. The solutions to such bias are described with respect to FIGS. 2A-10 below.

Figure 2B:
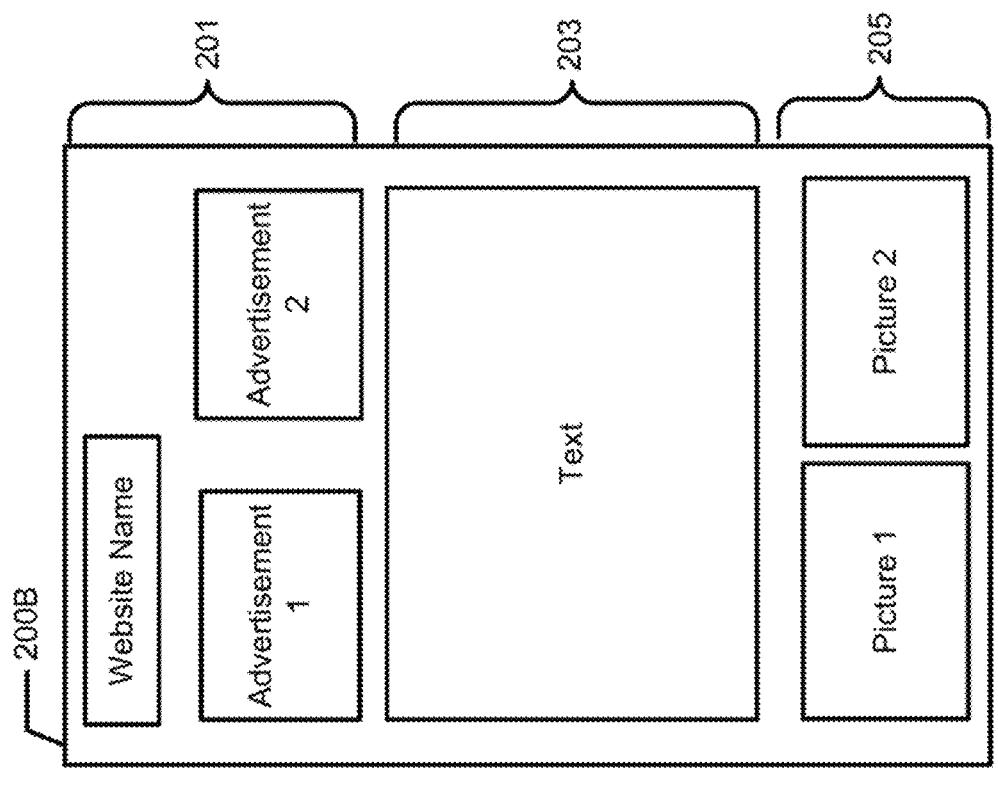
FIGS. 2A and 2B are example variations of a web page, according to one embodiment.
Figure 2A:
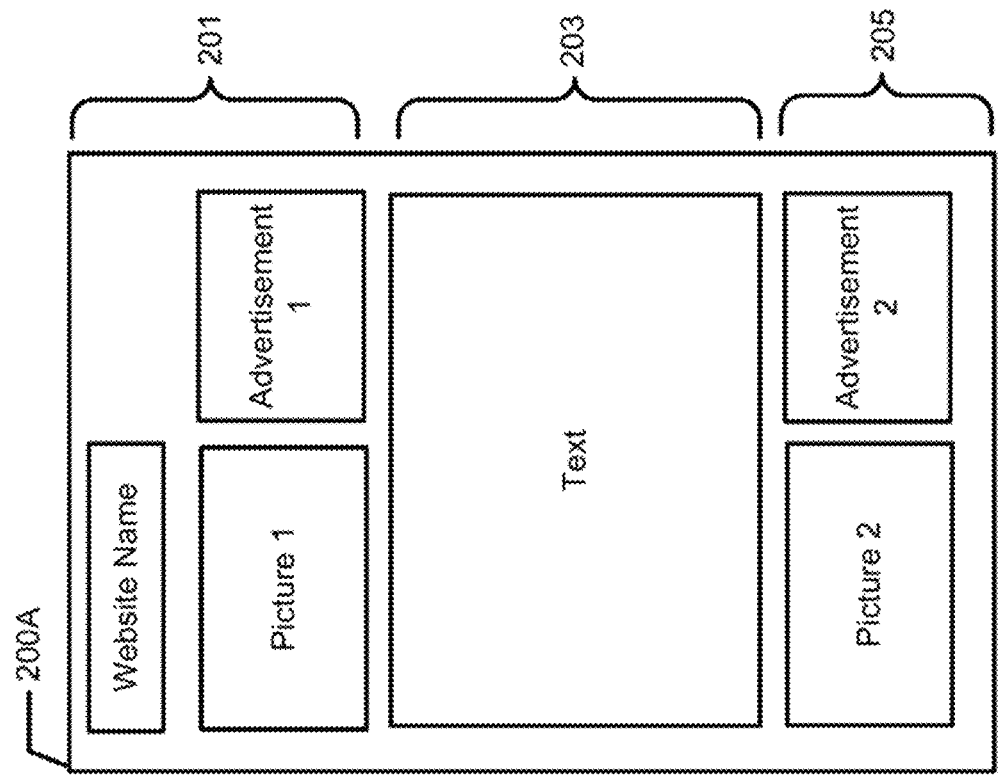

FIG. 2A is an example of an "A" variation (e.g., the control variation) of a web page 200A that represents the current implementation of the web page provided by content provider 107. The control variation of the web page 200A includes a website name of the website associated with the web page, a first picture, and a first advertisement. The website name, the first picture, and the first advertisement are located in an upper portion 201 of the control variation of web page 200A according to one embodiment. The control variation of web page 200A also includes textual content located in a central portion 203 of the control variation of web page 200A and the control variation of the web page 200A also includes a second picture and a second advertisement located at a lower portion 205 of the control variation of the web page 200A.

FIG. 2B is an example of a "B" variation (e.g., the variant version) of a web page e 200B. The variant version of the web page represented by web page 200B includes a change (i.e., a modification) to the control version of the web page 200A shown in FIG. 2A. The variant version of web page 200B includes the website name, a first advertisement, a second advertisement, textual content, a first picture, and a second picture similar to the control version of the web page 200A shown in FIG. 2A. However, the variant version of web page 200B includes the second advertisement positioned in the upper portion 201 of web page 200B whereas the second advertisement is positioned in the lower portion 205 in the control version of the web page 200A. In one embodiment, the variation test using the control version and the variant version of the web page is conducted to determine whether the second advertisement receives more selections when the second advertisement is located at the lower portion 205 of the web page as shown in FIG. 2A or when the second advertisement is located at the upper portion 201 of the web page as shown in FIG. 2B.

Referring back to FIG. 1, in one embodiment the content provider 107 includes a web server 111, web page 119, and web page content 123. The experiment system 105 includes experiment setup logic 113, content delivery logic 118, identification (ID) assignment logic 115, an ID database 116, and an experiment database 117. As is known in the art, the term "logic" refers to computer program logic utilized to provide the specified functionality. Thus, logic can be implemented in hardware, firmware, and/or software. In one embodiment, program logic is stored on a non-transitory storage device (i.e., a computer program product), loaded into a memory, and executed by one or more computer processors. Additionally, those of skill in the art will recognize that other embodiments of the content provider 107 shown in FIG. 1 can have different and/or other logic than that described here, and that the functionalities can be distributed among the logic in a different manner.

In one embodiment, the experiment database 117 stores multiple (i.e., a plurality) variation testing records that describe variation tests conducted by the experiment system 105. Each variation test record is associated with a web page (e.g., whether a static web page or a web page), an experiment identifier unique to the variation test, and identifiers of different variations (e.g., having different features) of a web page involved in the variation test. A variation test record may also include a description of the change(s) made to each variation of the web page compared to the control variation of the web page.

In one embodiment, the web server 109 links the content provider 107 to one or more client devices 102 and the experiment system 105 via the network 109. The web server 111 serves content items such as web pages, as well as other web related content, such as Java, Flash, XML, and so forth. The web server 111 may include a mail server or other messaging functionality for receiving and routing messages between the experiment system 105 and one or more client devices 102.

In one embodiment, the identification (ID) assignment logic 115 generates user identifiers for users of client devices 102. In one embodiment, the user identifier is used by the user of a client device 102 to log into a web page or application provided by the content provider 107. In one embodiment, a user identifier is a string of numbers that is unique to a particular client device 102. Alternatively, the client loaded on the webpage generates a cookie containing a randomly generated user identifier and sends this user identifier to assignment logic 115. Client device 102A may have a different user identifier than the user identifier for client device 102B. In one embodiment, the ID assignment logic 115 generates a user identifier by automatically incrementing the value of the last user identifier generated by the ID assignment logic 115 using an auto increment function. Alternatively, the ID assignment logic 115 generates a unique random number and assigns the unique random number as a user identifier for a client device 102. In another embodiment, the ID assignment logic 115 may receive a user identifier from a client device 102. The user identifier received from the client device 102 may be generated by the client device 102 or by the client loaded on the web page of the client device, or the user identifier may be input by the user into the client device 102. The ID assignment logic 115 may store user identifiers in the ID database 116 that maintains a record of all assigned user identifiers.

In one embodiment, responsive to the content provider 107 receiving a request for a web page from a client device, the ID assignment logic 115 communicates with the client device 102 to determine whether the client device 102 already has a user identifier. For example, the ID assignment logic 115 may query the client device 102 to transmit the user identifier via a login form displayed on the web page. In another example, the ID assignment logic 115 queries the client device 102 to determine whether the client device 102 includes a stored cookie that comprises a user identifier for the client device 102. If the client device 102 lacks a cookie with a user identifier for the client device 102, the ID assignment logic 115 may query the client device 102 to transmit the user identifier via a login form displayed on the web page. Alternatively, the ID assignment logic 115 generates a user identifier for the client device 102 and communicates the user identifier to the client device 102 for storage in a cookie at the client device 102 if the client device 102 lacks a cookie with a user identifier. The client device 102 may continue to use the user identifier generated by the ID assignment logic 115 for subsequent requests for the web page.

Figure 3A:
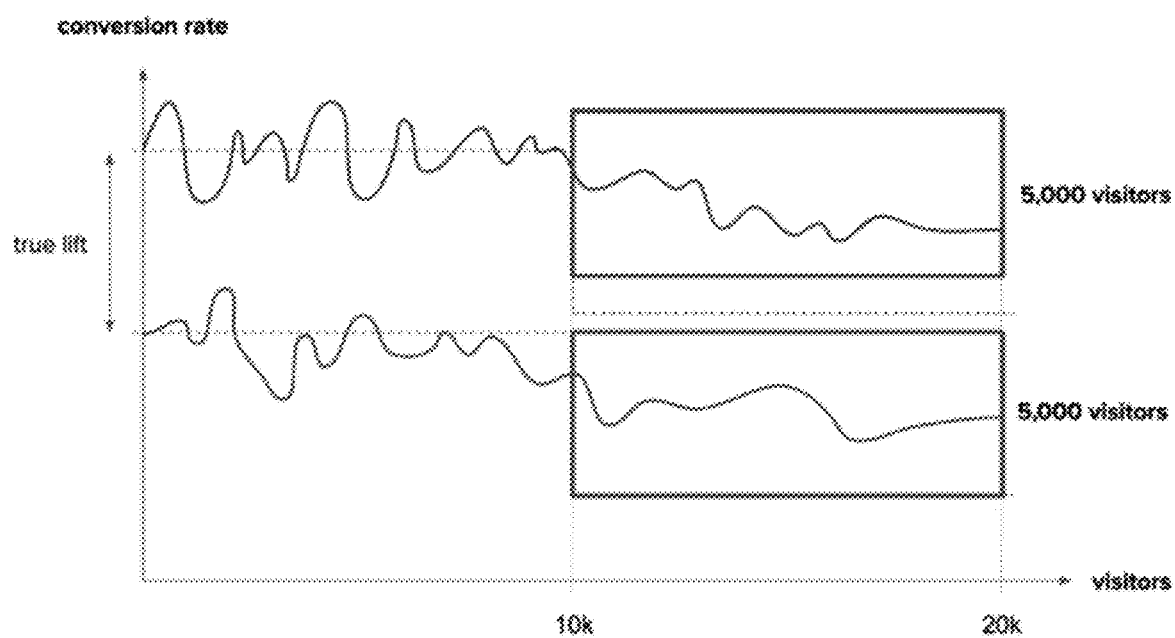
FIGS. 3A and 3B are graphs illustrating conversion rates for two variations when traffic allocation is static and dynamic, respectively, according to one embodiment.
Figure 3B:
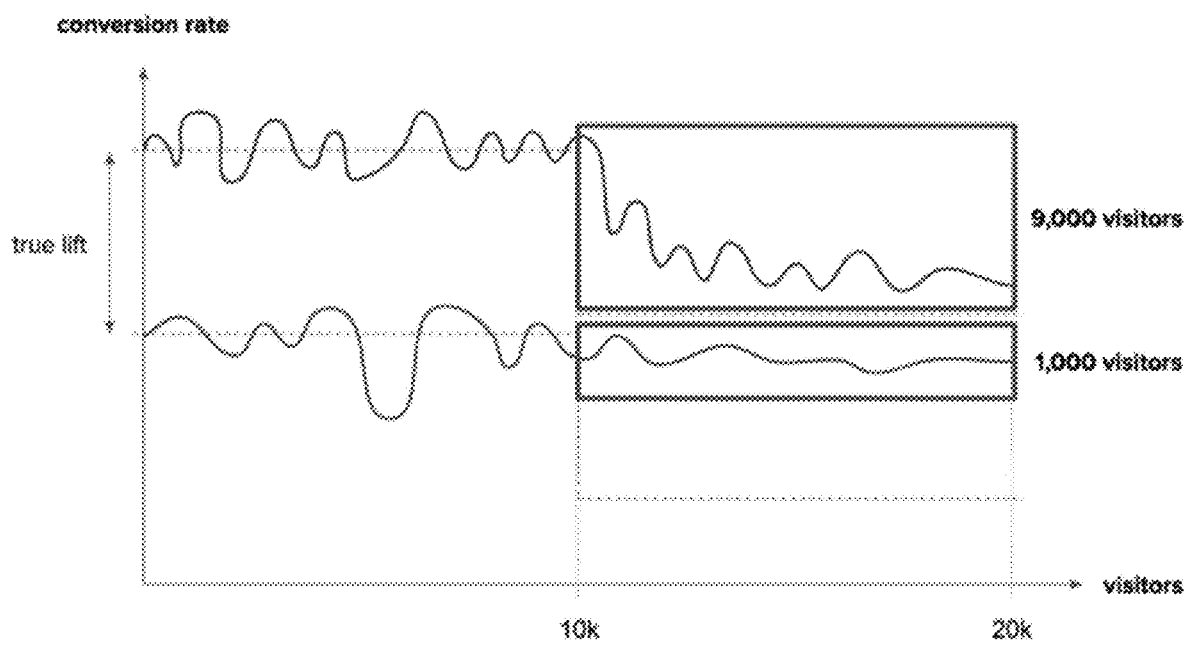

FIGS. 3A and 3B are graphs illustrating conversion rates for two variations when traffic allocation is static and dynamic, respectively, according to one embodiment. FIG. 3A shows conversion rates for two variations when traffic allocation is kept static. In this example, conversions for both variations begin to decline after each has been seen by 5,000 visitors. And while plenty of fluctuation in conversion rates is observed, the gap between the winning and losing variations never strays far from the true lift. In one embodiment, the steady decline in the observed conversion rates shown in FIG. 3A is caused by the sudden, one-time shift in the true conversion rates at the time when the experiment has 10,000 visitors.

FIG. 3B, illustrates what happens when traffic is dynamically allocated instead, with 90 percent of all traffic directed to the winning variation after each variation has been seen by 5,000 visitors. Here, the winning variation shows the same decline in conversion rates as it did in the previous example. However, because the losing variation has been seen by far fewer visitors, its conversion rates are slower to change.

This gives the impression that the difference between the two variations is much less than it actually is. Simpson's Paradox may be especially dangerous when the true lift is relatively small. In those cases, it can even cause the sign on results to flip, essentially reporting winning variations as losers and vice versa, as shown with respect to FIGS. 4A and 4B.

To prevent this, Epoch Stats Engine is described. Epoch Stats Engine (e.g., stats engine 112 of FIG. 1) may be a stratified estimate of the difference in mean values between the control and the treatment. Because it requires no estimation of the underlying time variation and is also compatible with other central limit theorem-based approaches such as the t-test, it lifts a substantial roadblock to combining traditional hypothesis testing and bandit approaches to A/B testing in practice. In one embodiment. Epoch Stats Engine may be used with a sequential test, such as a mixture sequential probability ratio test. Sequential testing is a statistical analysis method where the sample size is not fixed in advance; instead data evaluation is performed as the data is collected and further sampling is stopped according to a predefined stopping rule.

Figure 4A:
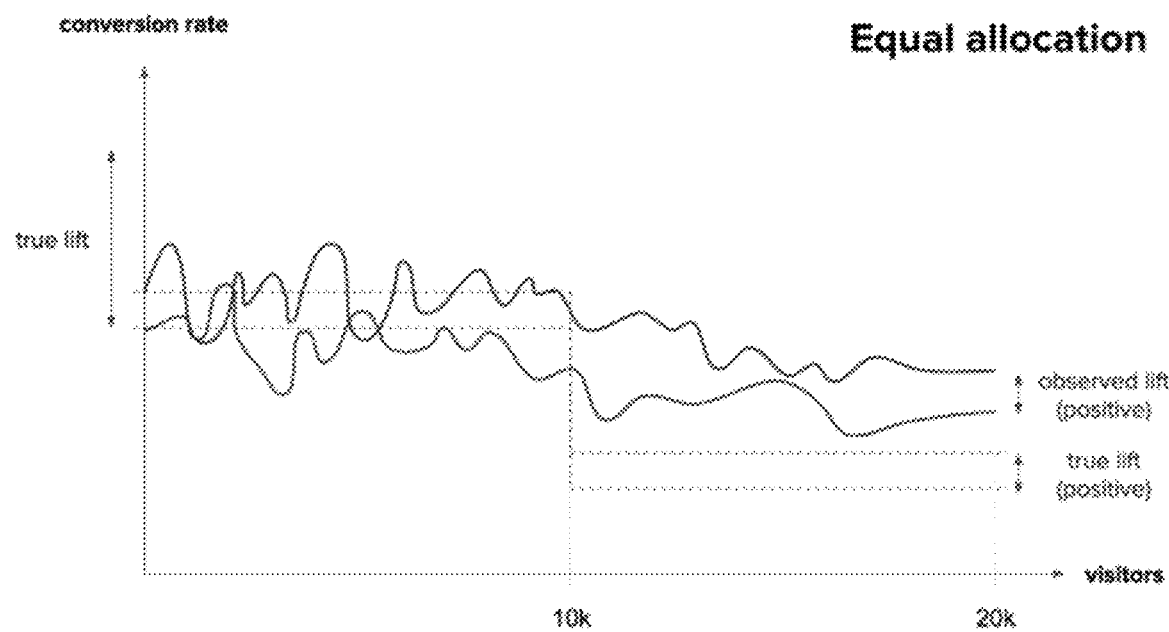
FIGS. 4A and 4B are graphs illustrating Simpson's Paradox for equal allocation and 90% allocation, respectively, according to one embodiment.
Figure 4B:
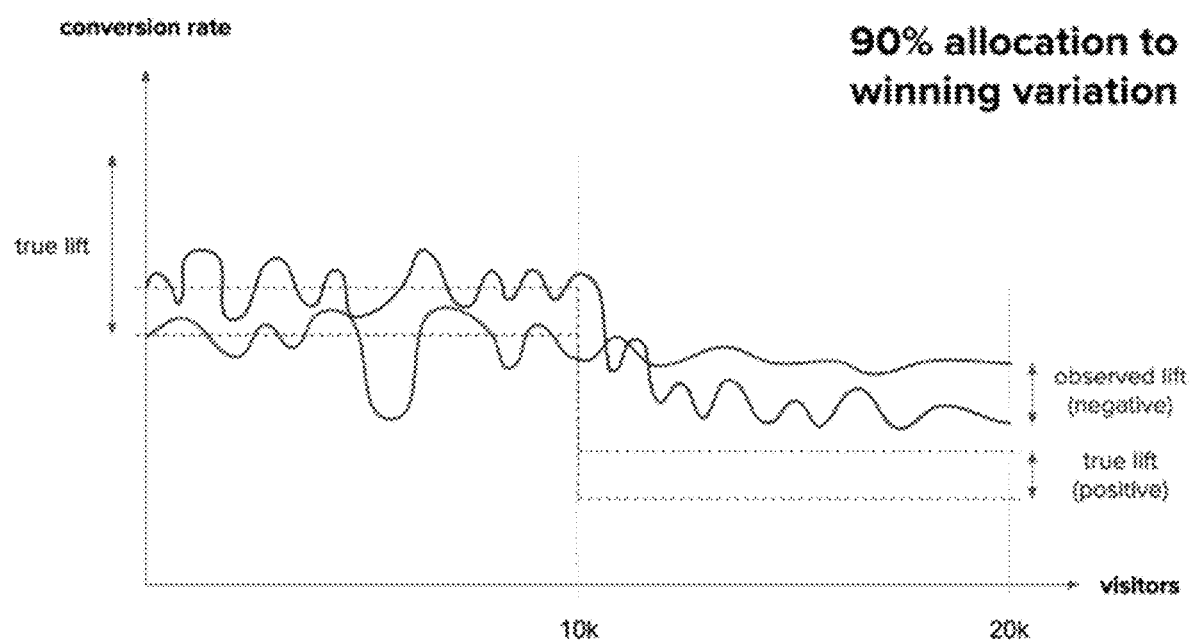

With respect to FIGS. 4A and 4B, the Stats Accelerator operations implemented with the Epoch Stats Engine described herein neutralizes this bias through a weighted-improvement technique. Weighted improvement is designed to estimate the true lift as accurately as possible by breaking down the duration of an experiment into much shorter segments called epochs. These epochs cover periods of constant allocation. In other words, traffic allocation between variations does not change for the duration of each epoch. Results may be calculated for each epoch, which has the effect of minimizing or eliminating the bias in each individual epoch. At the end of the experiment, these results may be used to calculate the estimated true lift, filtering out the bias that would have otherwise been present. Additional details with respect to Simpson's Paradox are described with respect to FIGS. 5A-10, below.

In one embodiment, when Stats Accelerator is utilized, an experiment's results may differ from other experiments in at least four visible ways. First, Stats Accelerator adjusts the percentage of visitors who see each variation. This means visitor counts may reflect the distribution decisions of the Stats Accelerator. Second, Stats Accelerator experiments, when implemented with Epoch Stats Engine, may use a different calculation to measure the difference in conversion rates between variations: weighted improvement. Weighted improvement may represent an estimate in the true difference in conversion rates that is derived from inspecting the individual time intervals between adjustments.

Third, Stats Accelerator experiments and campaigns, when implemented with Epoch Stats Engine, may use absolute improvement instead of relative improvement in results to avoid statistical bias and to reduce time to significance. In one embodiment, Relative improvement is computed as:

$$\frac{(\text{Variation conversion rate} - \text{Baseline conversion rate})}{\text{Baseline conversion rate}}$$

Absolute improvement is computed as:

Variation conversion rate−Baseline conversion rate

Fourth, reports associated with Stats Accelerator, when implemented with Epoch Stats Engine, may be generated to include absolute improvements in percentage points. In one embodiment, the winning variation displays its results in terms of approximate relative improvement as well. This may be provided for continuity purposes, so that customers who are accustomed to using relative improvement can develop a sense of how absolute improvement and relative improvement compare to each other.

Figure 5A:
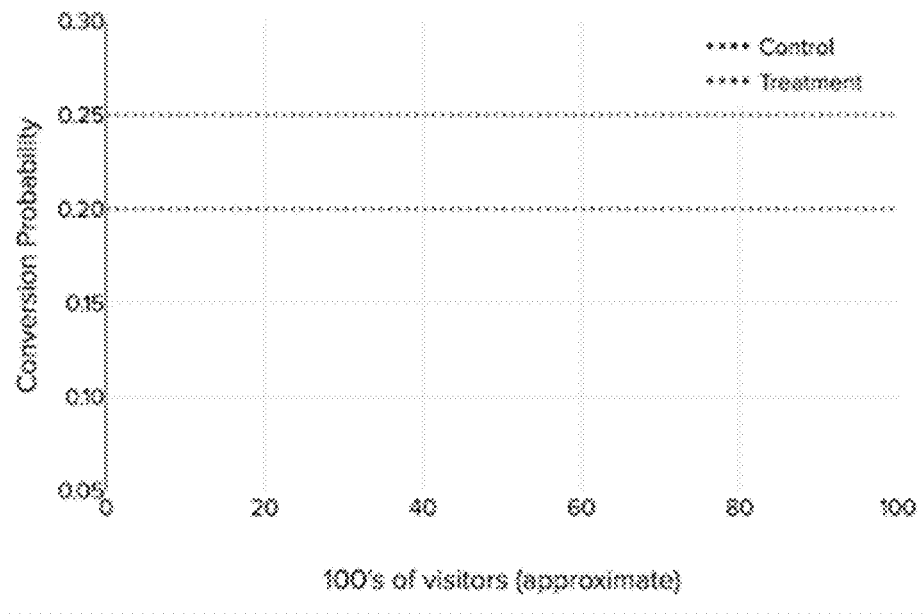
FIGS. 5A and 5B are graphs illustrating conversion probability in non-time variation and time variation cases, respectively, according to one embodiment.
Figure 5B:
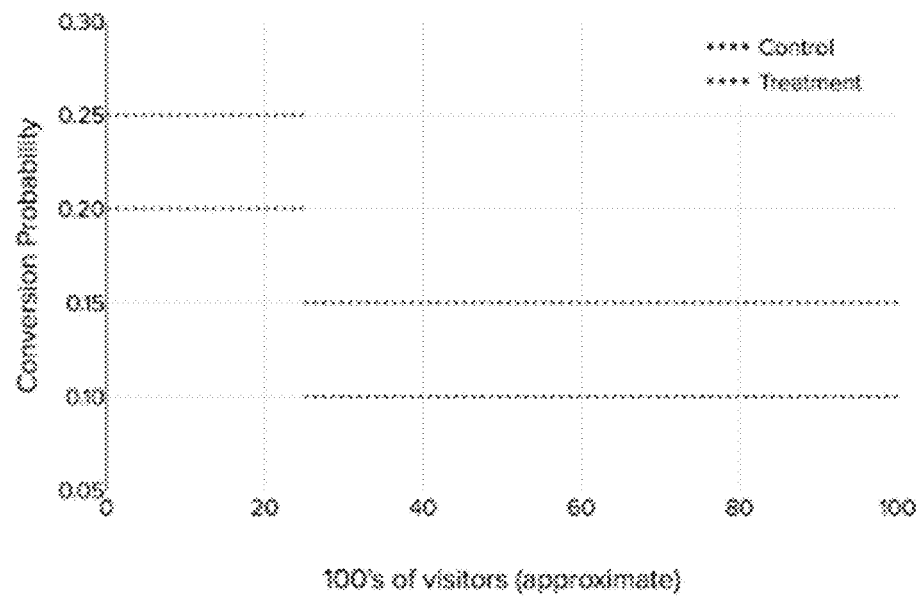

FIGS. 5A and 5B are graphs illustrating non-time variation and time variation, respectively, according to one embodiment. As described herein, when underlying conversion rates or mean values are varying over time (e.g., due to seasonality), dynamic traffic allocation can cause substantial bias in estimates of the difference between the treatment and the control, a phenomenon known as Simpson's Paradox. This bias can completely invalidate statistical results on experiments using Stats Accelerator, breaking usual guarantees on false discovery rate control.

A fundamental assumption behind many A/B tests is that the underlying parameter values of interest do not change over time, as shown with respect to FIG. 5A. When this assumption is violated, there is time variation, as shown in FIG. 5B. In the context of A/B experiments using Stats Accelerator, Simpson's Paradox can occur in the presence of time variation, so a precise understanding of time variation in this context is described.

In each experiment there are underlying quantities that determine the performance of each variation; measuring these quantities is of interest, but they cannot be observed. These are parameters. For example, in a conversion rate web experiment it is imagined that each variation of a page has some true ability to induce a conversion for each visitor. If this ability is expressed in terms of the probability that each visitor will convert, then these true conversion probabilities for each variation would be the parameters of interest. Since parameters are unobserved, point estimates maybe computed from the data to infer parameter values and decide whether the control or treatment is better. In the conversion rate example, the observed conversion rates would be point estimates for the true conversion probabilities of each variation.

Noise and randomness may cause point estimates to fluctuate. In the basic A/B scenario, these fluctuations may be viewed as centered around a constant parameter value. However, when the parameter values themselves fluctuate over time, reflecting underlying changes in the true performance of the control and treatment, time variation may be present.

An example of time variation may be seasonality. For example, it is often reasonable to suspect that visitors to a website during the workweek may behave differently than visitors on the weekends. Therefore, conversion rate experiments may see higher (or lower) observed conversion rates on weekdays compared to weekends, reflecting matching potential time variation in the true conversion rates which represents underlying true differences in how visitors behave on weekdays and weekends.

Time variation can also manifest as a one-time effect. A landing page with a banner for a 20%-off sale valid for the month of December may generate a higher-than-usual number of purchases per visitor for December, but then drop off after January arrives. This would be time variation in the parameter representing the average number of purchases per visitor for that page.

Time variation can take different forms and affect experiment results in different ways. Whether time variation is cyclic (e.g., seasonality) or transient (e.g., a one-time effect) suggest different ways to interpret results. Another key distinction regards how the time variation affects different arms of the experiment. Symmetric time variation occurs when parameters vary across time in a way such that all arms of the experiment are affected equally (in a sense to be defined shortly). Asymmetric time variation covers a broad swath of scenarios in which this is not the case. The Stats Engine described herein may include a feature to detect strong asymmetric time variation and reset statistical results accordingly to avoid misleading conclusions, but handling asymmetric time variation in general requires strong assumptions and/or a wholly different type of analysis.

In what follows, the symmetric case is presented for clarity, with an additive effect for simplicity. Specifically, the parameters for the control and treatment $\theta_C(t)$ and $\theta_T(t)$ may be written as $\theta_C(t)=\mu_C+f(t)$ and $\theta_T(t)=\mu_T+f(t)$ so that each can be decomposed into non-time-varying components $\mu_C$ and $\mu_T$ and the common source of the time variation $f(t)$. The underlying lift may therefore be written by the non-time-dependent quantity $\mu_T-\mu_C=\theta_T(t)-\theta_C(t)$.

Generally, symmetric time variation of this sort may occur when the source of the time variation is not associated with a specific variation but rather the entire population of visitors. For example, visitors during the winter holiday season may be more inclined to purchase in general. Therefore, a variation that induces more purchases will tend to maintain the difference over the control even with a higher overall holiday-influenced click-through rate for both the variation and the control.

In some embodiments, A/B testing procedures such as the t-test and sequential testing are robust to this type of time variation. This is because observers are often less interested in estimating the individual parameters of the control and treatment, and more interested in the difference between the parameters. Therefore, if both parameters are impacted in an additive manner by the same amount, then such time variation may be cancelled out once differences are taken and any subsequent inference will be relatively unaffected. Using the notation above, this can be seen in the fact that the difference in the time-varying parameters $\theta_T(t)-\theta_C(t)=\mu_T-\mu_C$ does not contain the time-varying factor $f(t)$. In various embodiments, the innocuous-seeming case of symmetric time variation can become much more complex when dynamic traffic allocation is introduced to the equation.

In one embodiment, if the traffic split in an experiment is adjusted in sync with underlying time variation, then a disproportionate amount of high- or low-performing traffic may be allocated to one arm relative to the other, biasing an observation of the true difference between the two arms. This is a form of Simpson's paradox, the phenomenon of a trend appearing in several different groups of data which then disappears or reverses when the groups are aggregated together. This bias can completely invalidate experiments on any platform by tricking the stats methodology into declaring a larger or smaller effect size than what actually exists.

For example, consider a two-month conversion rate experiment with one control and one treatment. In the month of November, the true conversion rates for the control and treatment are at 10% and 20%, respectively. For the month of December, they rise to 20% and 30%. In each month, the difference in conversion rates is 10 percentage points (pp).

If traffic is split 50% to treatment and 50% to control (or any other proportion for that matter) for the entire duration of the experiment, then it is clear that the final estimate of the difference between the two variations should be close to 10%. What happens if traffic is split 50/50 in November but then changes to 75% to control and 25% to treatment in December? For simplicity, let's assume that there are 1000 total visitors to the experiment in each month. A simple calculation shows that:
Control:
Total visitors: 500+750=1250
Percent from high-converting regime: 750/1250=60%
Treatment:
Total visitors: 500+250=750
Percent from high-converting regime: 250/750=33%
So both control and treatment have equal numbers of visitors from low-converting November, but the treatment has far fewer visitors than the control from high-converting December. This imbalance is an indicator that there will be bias, and doing the math confirms this: the conversion rate for the control will be around 16%, and the conversion rate for the treatment will be around 23%, a difference of only 7% rather than the 10% that we would normally expect. This phenomenon is also laid clear in a continuous view, as shown with respect to FIGS. 6A and 6B.

Figure 6A:
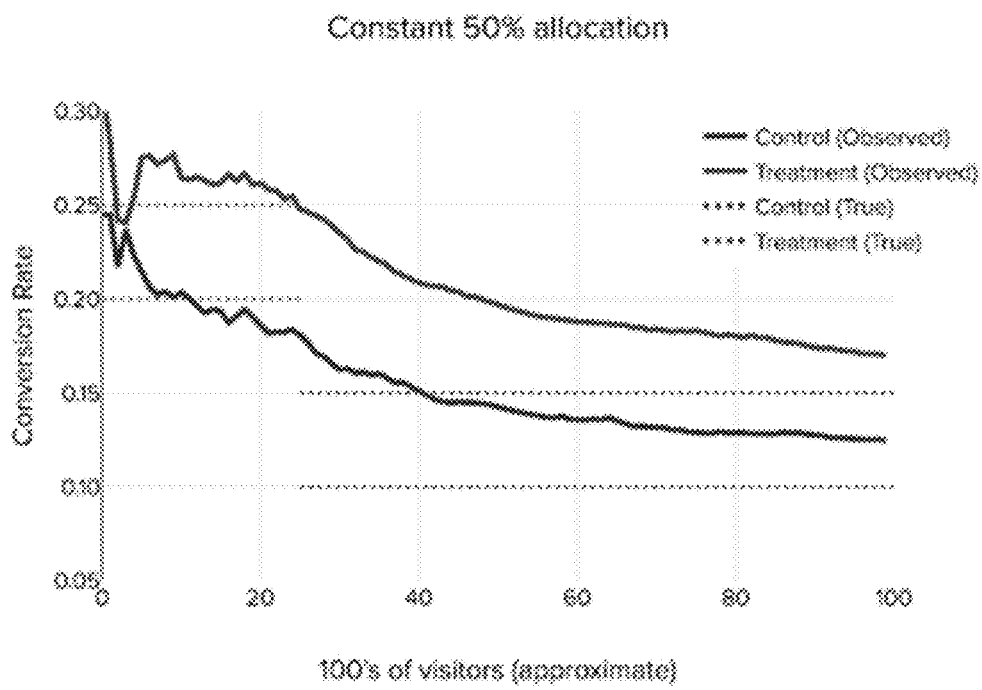
FIGS. 6A and 6B are graphs illustrating Simpson's paradox in non-time variation and time variation cases, respectively, according to one embodiment.
Figure 6B:
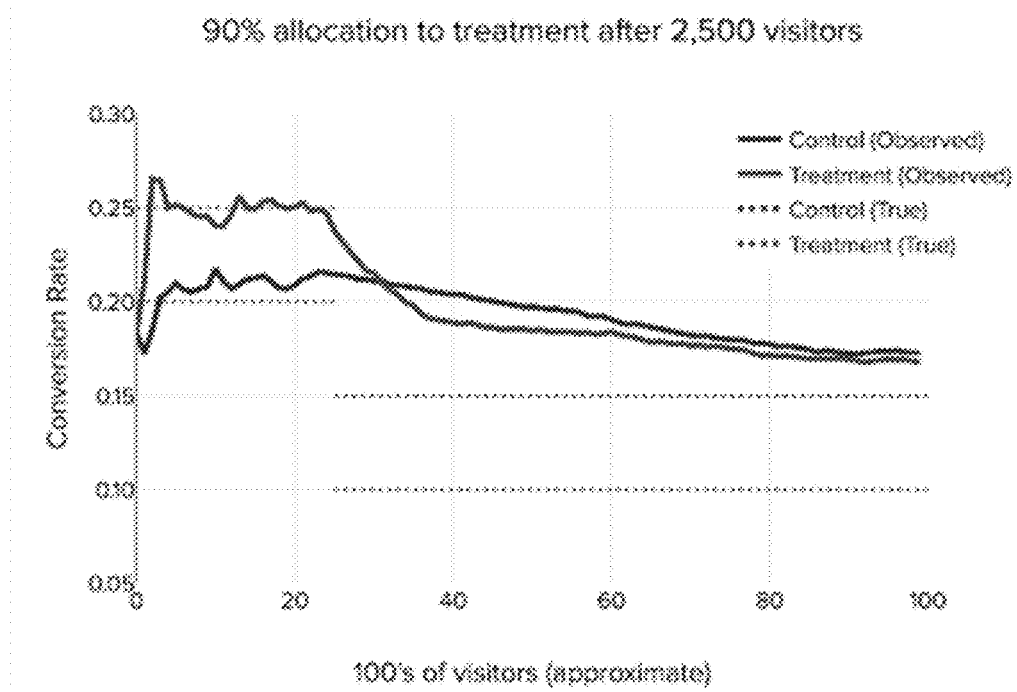

In this example, the diminished point estimate might cause a statistical method to fail to report significance when it otherwise would with an unbiased point estimate closer to 10%. But other adverse effects are also possible. When there is no true effect, Simpson's Paradox can cause the illusion of a significant positive or negative effect, leading to inflated false positives. Or, when the time variation is especially strong or the traffic allocation syncs up well with the time variation, then this bias can be so drastic as to reverse the sign of the estimated difference between the control and treatment parameters (as illustrated in FIG. 6B), completely misleading experimenters as to the true effect of their proposed change.

Since Simpson's Paradox manifests as a bias in the point estimate of the difference in mean values of the control and treatment, mitigating Simpson's Paradox means determining a way to remove such bias. In turn, removing bias requires accounting for one of the two factors causing it: time variation or dynamic traffic allocation. Since time variation is usually unknown and therefore must be estimated, but traffic allocation is directly controlled by the customer or experiment system and therefore known a solution focusing on the latter is provided herein.

In one embodiment, Simpson's paradox cannot occur over periods of constant traffic allocation. Therefore, an unbiased point estimate may be derived by making estimates within periods of constant allocation (called epochs) and then aggregating those individual within-epoch estimates to obtain one unbiased across-epoch estimate. Such a solution is simple enough to be applied to other statistical tests, such as the t-test.

In on embodiment, suppose there are K(n) total epochs by the time the experiment has seen n visitors. Within each epoch k, denote by $n_{k,C}$ and $n_{k,T}$ the sample sizes of the control and treatment respectively, and by $\hat{X}_k$ and $\hat{Y}_k$ the sample mean values of the control and treatment respectively. Letting $n_k = n_{k,C} + n_{k,T}$, the epoch estimator for the difference in mean values may be:

$$T_n = \sum_{k=1}^{K(n)} \frac{n_k}{n}(\overline{X}_k - \overline{Y}_k)$$

Because the dependence across epochs induced by the data-dependent allocation rule is restricted to changes in the relative balance of traffic between the control and treatment, the within-epoch estimates are orthogonal and the variance for $T_n$ is well-estimated by the sum of the estimated variances of each within-epoch component:

$$\hat{\mathrm{Var}}(T_n) = \sum_{k=1}^{K(n)} \left(\frac{n_k}{n}\right)^2 \left(\frac{\hat{\sigma}_C^2}{n_{k,C}} + \frac{\hat{\sigma}_T^2}{n_{k,T}}\right)$$

where $\hat{\sigma}_C$ and $\hat{\sigma}_T$ are consistent estimates for the standard deviations of the data-generating processes for the control and treatment arms. At a high level, $T_n$ is a stratified estimate where the strata represent data belonging to individual epochs of fixed allocation. At a low level, this is a weighted estimate of within-epoch estimates where the weight assigned to each epoch is proportional to the total number of visitors within that epoch.

Figure 7:
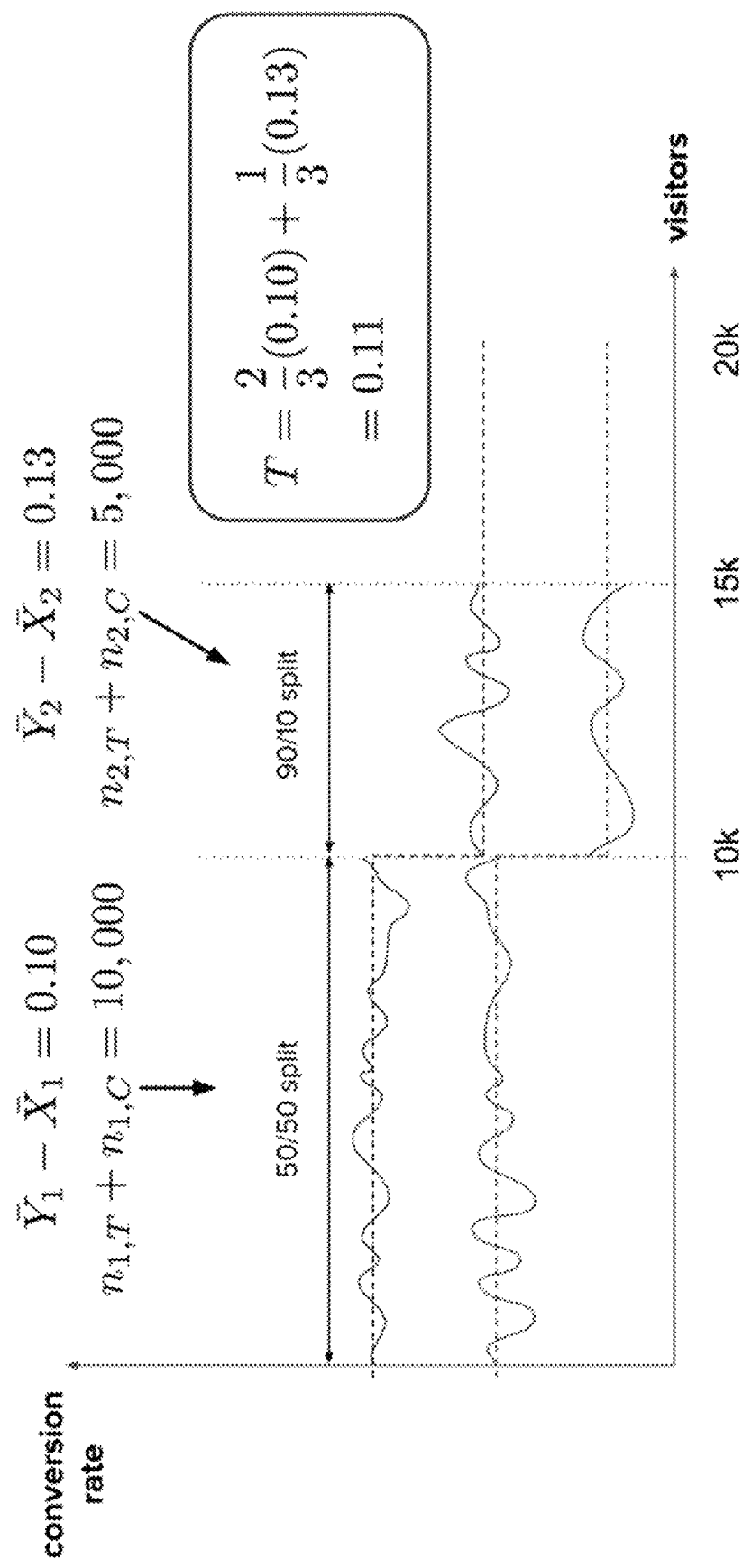
FIG. 7 is a graph illustrating a calculation of an epoch stratified estimate in the difference in true conversion probabilities in an experiment with both traffic allocation change and time variation, according to one embodiment.

FIG. 7 shows calculation of an epoch stratified estimate (computed at 15,000 visitors) of the difference in true conversion probabilities in an experiment with a traffic allocation change and one-time symmetric time variation both occurring at 10,000 visitors. It is worth repeating that the epoch estimate is guaranteed to be unbiased since each within-epoch estimate is unbiased.

Figure 8A:
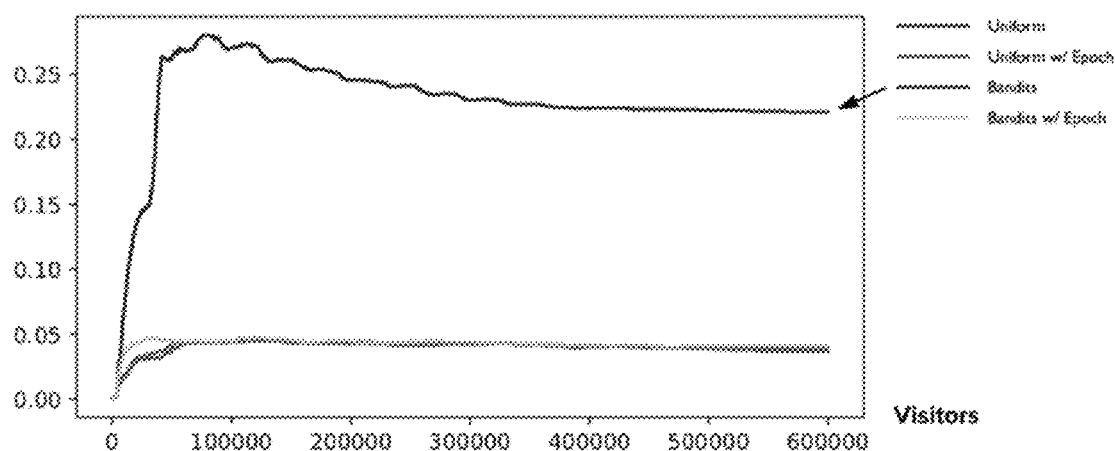
FIGS. 8A and 8B are graphs illustrating false discovery rate and true discovery rate, respectively, according to one embodiment.
Figure 8B:
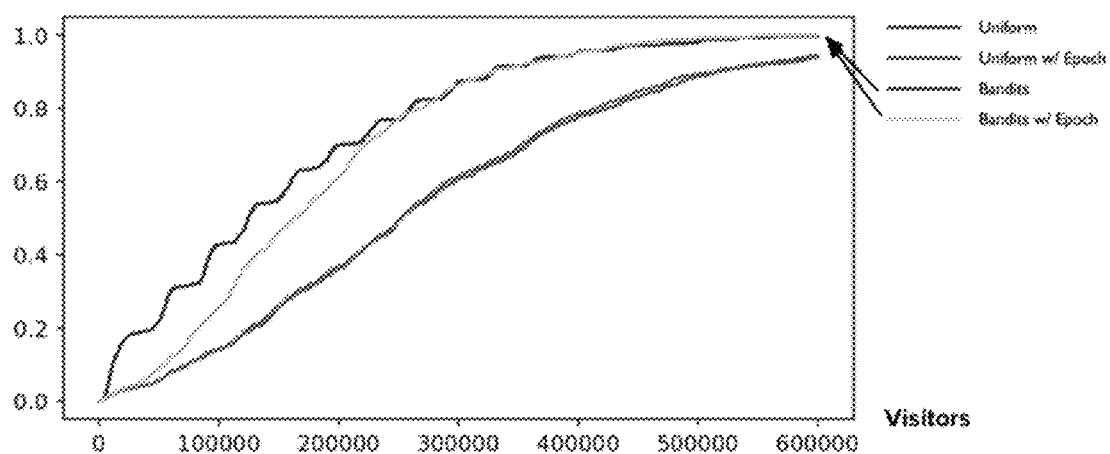

Turning now to FIGS. 8A and 8B, simulated data with time variation and results of running four different Stats Engine configurations on that data are provided:
1. Standard Stats Engine
2. Epoch Stats Engine
3. Standard Stats Engine with Accelerate Learnings
4. Epoch Stats Engine with Accelerate Learnings
Specifically, 600,000 draws from 7 Bernoulli arms with one control and 6 variants were generated, with one truly higher-converting arm and all others converting at the same rate as the control. The conversion rate for the control starts out at 0.10 and then undergoes cyclic time variation rising as high as 0.15. In each of these plots, visitors are plotted on the horizontal axis and either false discovery rate (FDR) or true discovery rate (TDR) are plotted on the vertical axis, averaged over 1000 simulations.

The False Discovery Rate (FDR) plot of FIG. 8A shows that Epoch Stats Engine does exactly what it is designed to do—protect customers from false discoveries due to Simpson's Paradox. The non-epoch bandit policy's FDR exceeds the configured FDR level (0.10) by up to 150% while the epoch-enabled bandit policy shows proper control of FDR at levels comparable to those achieved by Stats Engine without the bandit policy enabled. In one embodiment, this is the main goal—to bring FDR levels of bandit-enhanced A/B testing down to levels comparable to no bandit enabled at all.

The True Discovery Rate (TDR) plot shows that not much power is lost due to switching from standard to Epoch Stats Engine. First, a large gap is observed between the bandit allocation runs and the fixed allocation runs, reflecting the fact that speedup due to bandit allocation is preserved under Epoch Stats Engine. Furthermore, little difference is observed in time to significance between the epoch and non-epoch scenarios under fixed allocation while we observe a small gap in time to significance between the epoch and non-epoch scenarios under the bandit policy. This gap may be ascribed to the fact that the non-epoch Stats Engine running under dynamic allocation experiences high sensitivity to time variation, especially just after crossing an epoch boundary, thereby creating the scalloped shape of the blue curve.

Figure 9:
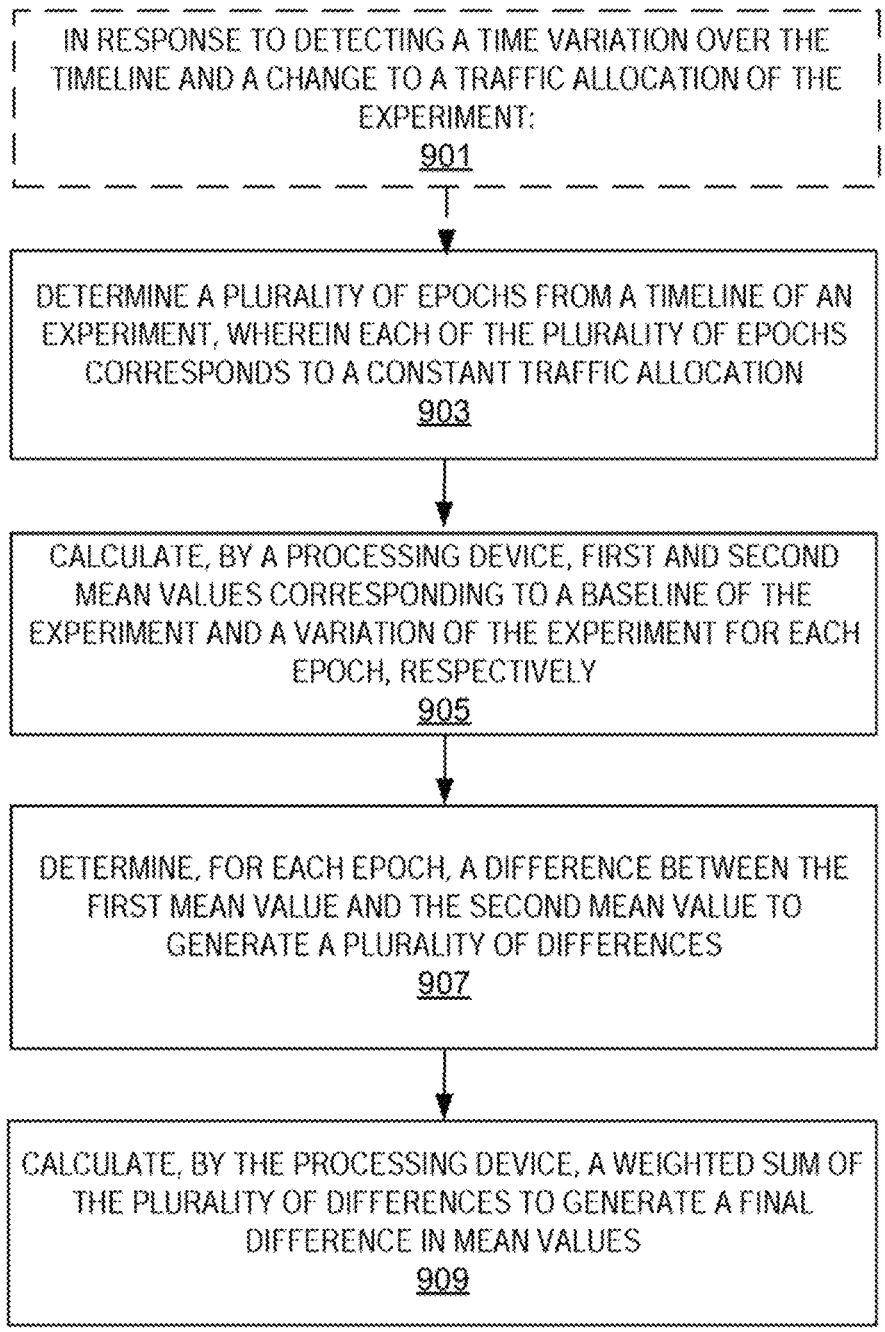
FIG. 9 is a flow diagram of a method of statistics acceleration in multivariate testing, in accordance with some embodiments of the present disclosure.

FIG. 9 is a flow diagram of a method 900 of statistics acceleration in multivariate testing, in accordance with some embodiments of the present disclosure. Method 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 900 may be performed by stats engine 112 of FIG. 1.

The method 900 begins at block 901, in which processing logic optionally determining the plurality of epochs in response to detecting a time variation over the timeline and a change to a traffic allocation of the experiment. In other words, the following operations of method 900 may be completes in response to determining that both time variation and dynamic traffic allocation are present during an experiment. In another embodiment, no such determination need be made for the operations to be performed. In one embodiment, the traffic allocation corresponds to a website or an application (e.g., a mobile, web, or other application).

At block 903, processing logic determines a plurality of epochs (e.g., time intervals, as described herein) from a timeline of an experiment. In one embodiment, each of the plurality of epochs corresponds to a constant traffic allocation. In one embodiment, the epochs may correspond to different and district time intervals (15 minutes, 30 minutes, 60 minutes, etc.). In another embodiment, each epoch corresponds to the same amount of time (e.g., approximately one hour (give or take ten minutes)). In one embodiment, the constant traffic allocation is only constant within the epoch, and may vary from epoch to epoch.

At block 905, processing logic calculates, by a processing device, first and second mean values corresponding to a baseline of the experiment and a variation of the experiment for each epoch, respectively. Processing logic may generate first and second mean values for each epoch in the plurality, or for only a subset of epochs.

At block 907, processing logic determines, for each epoch, a difference between the first mean value and the second mean value to generate a plurality of differences, where each of the plurality of differences corresponds to a different one of the plurality of epochs. At block 909, processing logic calculates, by the processing device, a weighted sum of the plurality of differences to generate a final difference in mean values. In one embodiment, the weighted sum is weighted in proportion to the number of visitors in each of the plurality of epochs. For example, a first epoch with twice the number of visitors of a second epoch might have twice the weight. In other embodiments, other weighting systems may be used.

In one embodiment, the final difference in mean values is equivalent (or approximately equivalent) to the same experiment being run over a timeline that does not include time variation. In other words, the final difference in mean values represents the results of the experiment while taking into account Simpson's Paradox. In one embodiment, processing logic may provide the final difference in mean values to a statistical test for further observation and/or analysis. For example, statistical test may be a t-test. In another example, the statistical test may be an A/B test. In one embodiment, if a threshold number of visitors is not achieved during any one epoch, epochs may be combined such that the threshold number is achieved as a result of the combination.

In one embodiment, processing logic may modify the experiment based on the final difference in mean values. For example, if the final difference in mean value indicates that a particular version of the experiment is desirable over another version, processing logic may modify the experiment to compare the desirable version to a new version. In another embodiment, processing logic may cause the experiment to end, based on the final difference in mean value. Processing logic may modify the experiment in a variety of other ways, based on the final difference in mean value.

Figure 10:
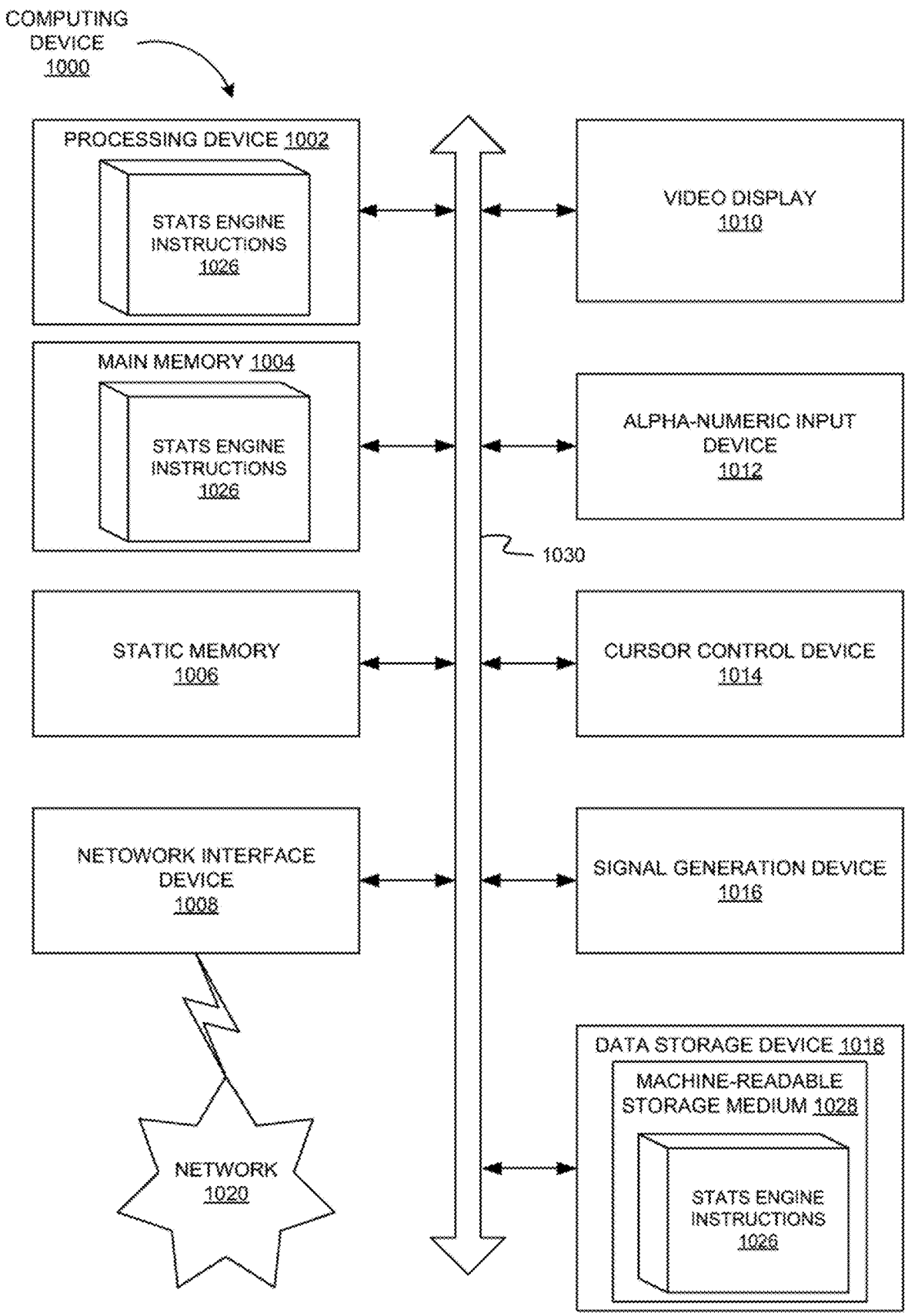
FIG. 10 is a block diagram of a computing device, in accordance with some embodiments of the present disclosure.

FIG. 10 is a block diagram of an example computing device 1000 that may perform one or more of the operations described herein, in accordance with some embodiments. In various embodiments, computing device 1000 may represent computing devices (e.g., servers) of the experimentation platform, third-party content provider client devices, and/or third-party content provider servers. Computing device 1000 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1000 may include a processing device (e.g., a general purpose processor, a PLD, etc.) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

Processing device 1002 may be provided by one or more general-purpose processing devices such as a microprocessor, central processing unit, or the like. In an illustrative example, processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may also comprise one or more special-purpose processing devices such as an application specific integrated circuit (ASIC), a field programmable gate array (FPGA), a digital signal processor (DSP), network processor, or the like. The processing device 1002 may be configured to execute the operations described herein, in accordance with one or more aspects of the present disclosure, for performing the operations and steps discussed herein.

Computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014

(e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

Data storage device 1018 may include a computer-readable storage medium 1028 on which may be stored one or more sets of instructions 1026, e.g., instructions for carrying out the operations described herein, in accordance with one or more aspects of the present disclosure. Stats engine instructions 1026 may also reside, completely or at least partially, within main memory 1004 and/or within processing device 1002 during execution thereof by computing device 1000, main memory 1004 and processing device 1002 also constituting computer-readable media. The instructions 1026 may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   determining a plurality of epochs from a timeline of an experiment, wherein each of the plurality of epochs corresponds to a time duration comprising a constant traffic allocation between a baseline of the experiment and a variation of the experiment, wherein both the baseline of the experiment and the variation of the experiment are presented to visitors during each epoch of the plurality of epochs according to the respective constant traffic allocation of the time duration corresponding to the epoch, wherein at least two of the plurality of epochs have a different constant traffic allocation, and wherein determining the plurality of epochs is performed in response to detecting time variations over the timeline and a dynamic change to a traffic allocation of the experiment between the baseline of the experiment and the variation of the experiment;

calculating, by a processing device, first and second mean values corresponding to the baseline of the experiment and the variation of the experiment for each epoch, respectively;

determining, for each epoch, a difference between the first mean value and the second mean value to generate a plurality of differences;

calculating, by the processing device, a weighted sum of the plurality of differences to generate a final difference in mean values; and modifying the experiment based on the final difference in mean values.

2. The method of claim 1, wherein the constant traffic allocation corresponds to traffic of a website or an application.

3. The method of claim 2, wherein the website or application is undergoing an A/B test.

4. The method of claim 1, wherein the weighted sum is weighted in proportion to a number of the visitors in each of the plurality of epochs.

5. The method of claim 1, further comprising providing the final difference in mean values to a statistical test.

6. The method of claim 5, wherein the statistical test is a t-test.

7. The method of claim 6, wherein the statistical test is a sequential test.

8. The method of claim 1, further comprising:
determining that a threshold number of the visitors was not reached during a first epoch of the plurality of epochs; and
in response to the determining, combining the first epoch with a second epoch.

9. A system comprising:
a memory to store a final difference in mean values;
a processing device, operatively coupled to the memory, to:
determine a plurality of epochs from a timeline of an experiment, wherein each of the plurality of epochs corresponds to a time duration comprising a constant traffic allocation between a baseline of the experiment and a variation of the experiment, wherein both the baseline of the experiment and the variation of the experiment are presented to visitors during each epoch of the plurality of epochs according to the respective constant traffic allocation of the time duration corresponding to the epoch, wherein at least two of the plurality of epochs have a different constant traffic allocation, and wherein determining the plurality of epochs is performed in response to detecting time variations over the timeline and a dynamic change to a traffic allocation of the experiment between the baseline of the experiment and the variation of the experiment;
calculate first and second mean values corresponding to the baseline of the experiment and the variation of the experiment for each epoch, respectively;
determine, for each epoch, a difference between the first mean value and the second mean value to generate a plurality of differences;
calculate a weighted sum of the plurality of differences to generate the final difference in mean values; and
modify the experiment based on the final difference in mean values.

10. The system of claim 9, wherein the constant traffic allocation corresponds to traffic of a website or an application.

11. The system of claim 10, wherein the website or application is undergoing an A/B test.

12. The system of claim 9, wherein each of the plurality of epochs is approximately one hour.

13. The system of claim 9, wherein the weighted sum is weighted in proportion to a number of the visitors in each of the plurality of epochs.

14. The system of claim 9, wherein the processing device is further to provide the final difference in mean values to a statistical test.

15. The system of claim 9, wherein the processing device is further to:
determine that a threshold number of the visitors was not reached during a first epoch of the plurality of epochs; and
in response to the determination, combine the first epoch with a second epoch.

16. A non-transitory computer-readable storage medium including instructions that, when executed by a processing device, cause the processing device to:
determine a plurality of epochs from a timeline of an experiment, wherein each of the plurality of epochs corresponds to a time duration comprising a constant traffic allocation between a baseline of the experiment and a variation of the experiment, wherein both the baseline of the experiment and the variation of the experiment are presented to visitors during each epoch of the plurality of epochs according to the respective constant traffic allocation of the time duration corresponding to the epoch, wherein at least two of the plurality of epochs have a different constant traffic allocation, and wherein determining the plurality of epochs is performed in response to detecting time variations over the timeline and a dynamic change to a traffic allocation of the experiment between the baseline of the experiment and the variation of the experiment;
calculate, by the processing device, first and second mean values corresponding to the baseline of the experiment and the variation of the experiment for each epoch, respectively;
determine, for each epoch, a difference between the first mean value and the second mean value to generate a plurality of differences;
calculate, by the processing device, a weighted sum of the plurality of differences to generate a final difference in mean values; and
modify the experiment based on the final difference in mean values.

17. The non-transitory computer-readable storage medium of claim 16, wherein the weighted sum is weighted in proportion to a number of the visitors in each of the plurality of epochs.

18. The non-transitory computer-readable storage medium of claim 16, providing the final difference in mean values to a statistical test.

19. The non-transitory computer-readable storage medium of claim 16, further comprising:
   determining that a threshold number of the visitors was not reached during a first epoch of the plurality of epochs; and
   in response to the determining, combining the first epoch with a second epoch.

20. The non-transitory computer-readable storage medium of claim 16, wherein the constant traffic allocation corresponds to traffic of a web site or an application.

* * * * *